Patented June 26, 1951

2,558,298

UNITED STATES PATENT OFFICE 2,558,298

METHOD OF PREPARING 4-AMINO-SALICYLIC ACID

Martin E. Hultquist, Bound Brook, and Frank W. Bagienski, Manville, N. J., assignors to American Cyanamid Company, New York, N. Y., a corporation of Maine No Drawing. Application July 27, 1948, Serial No. 40,993

1 Claim. (Cl. 260—519)

This invention relates to an improved process for producing 4-aminosalicylic acid.

In the past 4-aminosalicylic acid has been prepared by the reaction of an alkali metal carbonate with meta-aminophenol. It has also been proposed to carry out the reaction in the presence of free carbon dioxide which is equivalent to effecting the reaction of the meta-aminophenol with a bicarbonate. When this modification was used, the reaction medium contained a relatively large amount of water, for example, ten times the weight of the meta-aminophenol. This latter is the process used today for the practical production of 4-aminosalicylic acid.

Production costs on 4-aminosalicylic acid are of vital importance as one of the fields of utility and the compound is used as a chemotherapeutic agent in tuberculosis. The compound is used in enormous doses and, therefore, production cost is a vital matter. The expensive starting material is meta-aminophenol and the very low yields based on the expensive raw material which have obtained in the past has been the most serious factor in increasing the cost of 4-aminosalicylic acid to its present very high figure.

While the conversion based on the meta-aminophenol which actually reacts is satisfactory, the recovery of the unreacted meta-aminophenol from the dilute reaction mixture presents a serious problem and in the past the amount recovered has been unsatisfactory. This has resulted in a poor overall yield based on the meta-aminophenol used even though the actual conversion on the meta-aminophenol which reacts is satisfactory. That is to say, the production of by-products is not excessive. Since meta-aminophenol is the expensive raw material used in the process, the cost of the 4-aminosalicylic acid is determined by the overall yield on the meta-aminophenol used, and this has been rather low amounting only to about 41% when unreacted meta-aminophenol is recovered only by filtration and slightly over 61% when the filtrate from the recovery step is extracted with isopropyl acetate.

The present invention effects a marked increase in overall yield when operating with bicarbonates with or without a carbon dioxide atmosphere by sharply reducing the ratio of water to meta-aminophenol. Very marked improvements in yield are obtained when the ratio of water to meta-aminophenol is reduced to about 7 to 1, yield increases of about 30% being obtained. Further reduction in the ratio of water to meta-aminophenol increases the yield. Maximum results giving yield increases of more than 60% are obtained when the ratio is reduced to about 2.5 to 1. With more concentrated solutions the yield drops off somewhat and the range of ratio of water to meta-aminophenol for best operating conditions is from about 5 to 1 to 2.5 to 1. When the concentration materially exceeds 2.5 to 1, the meta-aminophenol reacted does not all go to producing 4-aminosalicylic acid and side reactions take place to a rapidly increasing degree. In fact, even at 2.5 to 1 concentration, conversion of meta-aminophenol reacted shows a considerable drop. This is compensated for by a greatly increased recovery of the unreacted chemical but as in most cases where there are two factors operating in different directions, a compromise produces optimum results and in the present reaction when sodium bicarbonate is used the optimum concentration corresponds to about 2.5 parts of water per part of meta-aminophenol.

The greatly increased yield based on meta-aminophenol results in very marked savings, the cost of production being reduced by more than one third when optimum conditions are employed. At the same time 4-aminophenol is obtained in excellent quality and after the usual simple purification a product is obtained having the high chemical purity necessary for therapeutic use.

Another factor which is effective is temperature. Best results are obtained when the temperature is above 100° C. and in the region of from 120–140° C. There is some falling off in yield when the temperature drops as low as 90° C. although the overall results still are better than in the process used in the past with a large amount of water.

It is an advantage of the process of the present invention that the operating conditions are not critical. For example, the pressure of carbon dioxide can vary from atmospheric up to any pressure for which the equipment is suitable. It is desirable to maintain a positive pressure but this can be moderate, for example, about 50 pounds per square inch, and very high pressures with corresponding equipment complications are not necessary.

We have found that optimum results are obtained with sodium bicarbonate as the alkali and because this is also the cheapest bicarbonate readily available, it is preferred for practical operation. However, potassium bicarbonate may be used though it does not give quite so high yields and is more difficult to recover, and ammonium bicarbonate is also suitable. Bicarbonates of the alkaline earth metals may be used in the present invention but do not give results as good as those obtainable with sodium bicarbonate.

The present invention will be described in greater detail in conjunction with the following specific examples. The parts are by weight.

Example 1

To a mixture of 37 parts meta-aminophenol, 320 parts sodium bicarbonate and 370 parts water charged to an autoclave, there is added carbon dioxide to bring the pressure to 50 lbs. per square inch. The reaction mixture is then heated to and maintained at 125–130° C. for 16 hours. The solution is then cooled to 10–15° C. to allow the unreacted meta-aminophenol and sodium bicarbonate to crystallize from the reaction mixture. The crystallized solids are separated by filtration and dried. This product contains about 2.45 parts of meta-aminophenol and 242.5 parts of sodium bicarbonate as determined by a separation method based upon extraction with isopropyl acetate.

The filtrate from these recovered solids is extracted with isopropyl acetate and from this extract 11.5 parts of unreacted meta-aminophenol are recovered.

The aqueous filtrate after extraction is heated to 30–40° C. and sufficient 36% hydrochloric acid is added to lower the pH to 1–2. After cooling the charge, the precipitated product is filtered off, washed with a small amount of water and dried. There is obtained 24.6 parts of light grey 4-aminosalicylic acid hydrochloride which corresponds to a conversion of 38.2% based upon gross usage of meta-aminophenol, a yield of 41% based upon net usage of meta-aminophenol after recovery by filtration and a yield of 61.5% based upon net usage of meta-aminophenol after total recovery by filtration and extraction of the aqueous filtrate.

This example represents the best operating conditions which have been used in the past and should be considered as a standard of comparison against which the succeeding examples, which represent the present invention, are to be measured.

Example 2

To a mixture of 74 parts meta-aminophenol, 160 parts sodium bicarbonate and 370 parts water charged to an autoclave, there is added carbon dioxide to bring the pressure to 50 lbs. per square inch. The reaction mixture is then heated to and maintained at 125–130° C. for 16 hours; the solution is then cooled to 10–15° C. to allow the unreacted starting materials to crystallize. The solids are filtered off and dried. This product contains 25.7 parts of meta-aminophenol and 92 parts of sodium bicarbonate as determined by the extraction procedure of Example 1.

There is recovered an additional 11.5 parts of meta-aminophenol from the aqueous filtrate by extracting with isopropyl acetate.

The aqueous solution, after extraction, is heated to 30–40° C. and sufficient 36% hydrochloric acid is added to bring the pH to 1–2 to precipitate the 4-aminosalicylic acid hydrochloride. After cooling, filtering, washing with a small amount of water and drying, there is obtained 53 parts of the light grey product. This corresponds to a percentage conversion of 41% based upon gross usage of meta-aminophenol, a yield of 63% based upon net usage of meta-aminophenol after recovery by filtration, and a yield of 83% based upon net usage of meta-aminophenol after total recovery by filtration and extraction of the aqueous filtrate.

Example 3

The procedure of Example 2 is followed, the amount of water is reduced to 259 parts giving a ratio of water to meta-aminophenol of 7 to 1. The conversion based on gross meta-aminophenol usage is 40%. The yield based on meta-aminophenol after recovery by filtration is 54.5% and 74.2% after recovery by both filtration and extraction of the filtrate.

Example 4

The procedure of Example 2 is followed substituting 190 parts of potassium bicarbonate for the 160 parts of sodium bicarbonate. The percentage conversion based on gross meta-aminophenol usage is 43.8%. The yield is 54.3% based on net meta-aminophenol usage after recovery by filtration and 74% after recovery by both filtration and extraction.

Example 5

The procedure of Example 2 is duplicated using 148 parts of meta-aminophenol in place of the 74 parts described therein. There is obtained 85.5 parts of light-grey 4-aminosalicylic acid hydrochloride. This corresponds to a percentage conversion of 33.3% based on gross meta-aminophenol usage, a yield of 66.3% based on net meta-aminophenol usage after recovery by filtration and 85.5% yield based on net usage after recovery by filtration and extraction.

Example 6

The procedure of Example 2 is duplicated using 222 parts of meta-aminophenol instead of the 74 parts described therein. There is obtained 112 parts of light-grey 4-aminosalicylic acid hydrochloride. This corresponds to a percentage conversion of 29% based on gross meta-aminophenol usage, a yield of 64% based on net meta-aminophenol usage after recovery by filtration and 78% based on net meta-aminophenol usage after recovery by filtration and extraction.

Example 7

A mixture of 148 parts meta-aminophenol, 54 parts sodium bicarbonate and 370 parts water is heated to 90–95° C. After 4 hours of heating 54 parts sodium bicarbonate is added. A third and final portion of 54 parts sodium bicarbonate is added after 4 hours more of heating. The reaction is then heated for 16 hours more making a total of 24 hours of heating at 90–95° C. The solution is then cooled to 10–15° C. and the unreacted meta-aminophenol and sodium bicarbonate is separated by filtration, washed with a small amount of water and dried. The amount recovered is 129 parts and this contains 85 parts of meta-aminophenol and 44 parts of sodium bicarbonate. There is recovered 13.8 parts additional meta-aminophenol by extracting the aqueous solution with isopropyl acetate. The aqueous solution is then acidified to a pH of 1–2 with concentrated hydrochloric acid, cooled to 10–15° C. filtered, washed with a small amount of water and dried. The yield of 4-aminosalicylic acid hydrochloride is 65 parts. This corresponds to a percentage conversion of 25.4% based on gross usage of meta-aminophenol, a yield of 60% based upon net usage of meta-aminophenol after recovery by filtration and a yield of 77% based upon net usage of meta-aminophenol after total recovery by filtration and extraction of the aqueous filtrate.

The results of the foregoing examples are tabulated in the following table, meta-aminophenol is abbreviated as MAP.

| Parts Taken | | | Ratio MAP to Water | t oc | $CO_2$, p. s. i. | Conv. | Per cent yield with MAP filtered | Per cent yield with total MAP Rec'v. |
|---|---|---|---|---|---|---|---|---|
| MAP | $NaHCO_3$ | Water | | | | | | |
| 37 | 320 | 370 | 1 to 10 | 125–130 | 50 | 38.2 | 41 | 61.5 |
| 74 | 160 | 259 | 1 to 7 | 125–130 | 50 | 40 | 54.5 | 74.2 |
| 74 | 160 | 259 | 1 to 5 | 125–130 | 50 | 41 | 63 | 83 |
| 148 | 160 | 370 | 1 to 2.5 | 125–130 | 50 | 33.3 | 66.3 | 85.5 |
| 222 | 160 | 370 | 1 to 1.6 | 125–130 | 50 | 29 | 64 | 78 |
| 74 | 190 | 370 | 1 to 5 | 125–130 | 50 | 43.8 | 54.3 | 73.5 |
| 148 | $KHCO_3$ 160 | 370 | 1.2.5 | 90–95 | 0 | 25.4 | 60 | 77 |

We claim:

A cyclic process of producing 4-aminosalicylic acid comprising the steps of forming an aqueous mixture of meta-aminophenol and sodium bicarbonate wherein the concentration of meta-aminophenol is 1 part by weight of meta-aminophenol in from 2.5 to 5 parts by weight of water, heating the mixture at super-atmospheric pressure in the presence of carbon dioxide whereby a solution of 4-aminosalicylic acid is formed, cooling the solution to precipitate a mixture of sodium bicarbonate and unreacted meta-aminophenol in the form of free base, filtering the so cooled solution to remove the precipitate, recovering the 4-aminosalicylic acid from the filtrate and forming a new aqueous mixture of meta-aminophenol and sodium bicarbonate with the precipitate.

MARTIN E. HULTQUIST.
FRANK W. BAGIENSKI.

REFERENCES CITED

The following references are of record in the file of this patent:

UNITED STATES PATENTS

| Number | Name | Date |
|---|---|---|
| 427,564 | Gnehm et al. | May 13, 1890 |
| 1,847,518 | Laska et al. | Mar. 1, 1932 |
| 1,969,357 | Christiansen | Aug. 7, 1934 |

FOREIGN PATENTS

| Number | Country | Date |
|---|---|---|
| 12,191 | Great Britain | 1889 |

OTHER REFERENCES

Gatterman: "Organic Chemistry" (Macmillan 1896), pp. 8–11, 39–42.